United States Patent [19]
Taylor

[11] 3,918,749
[45] Nov. 11, 1975

[54] CONCRETE HOSE AND COUPLING
[75] Inventor: Edward A. Taylor, Palos Verdes, Calif.
[73] Assignee: Construction Forms, Inc., Cedarburg, Wis.
[22] Filed: Aug. 7, 1974
[21] Appl. No.: 495,506

[52] U.S. Cl. ............... 285/256; 285/259; 156/275; 156/294; 138/109; 138/133
[51] Int. Cl.² ........................................ F16L 33/00
[58] Field of Search .......... 285/240, 241, 242, 256, 285/259; 156/275 X, 294 X; 161/139; 138/109, 133

[56] References Cited
UNITED STATES PATENTS

| | | | |
|---|---|---|---|
| 2,241,125 | 5/1941 | Girard | 138/133 UX |
| 2,740,427 | 4/1956 | Swan | 138/133 X |
| 2,888,277 | 5/1959 | Melsom | 285/256 X |
| 2,890,264 | 6/1959 | Duff | 138/133 X |
| 3,294,607 | 12/1966 | Rothermel et al. | 156/275 X |
| 3,506,519 | 4/1970 | Blumenkranz | 156/275 |
| 3,559,693 | 2/1971 | Reynard | 138/133 |

Primary Examiner—Werner H. Schroeder
Assistant Examiner—Wayne L. Shedd
Attorney, Agent, or Firm—Andrus, Sceales, Starke & Sawall

[57] ABSTRACT

A flexible hose for transport of concrete and the like includes a hardened helical wire to prevent collapse under negative pressure and bending of the hose. The hose is provided with an end coupling having a hardened inner shank with the outer surface serrated or the like to provide firm interengagement with the inner hose surface grooved for interconnection by the conventional releasable coupler. The hose end is specially processed to remove the hardness from the helical wire. The hose may be abraded adjacent the location of the inner end of the shank and a current passed through the end portion of the wire. The hose is forced over the shank and an outer clamp device forces the hose with the soft helical wire onto the shank and firmly affixes the hardened shank to the hose.

5 Claims, 5 Drawing Figures

CONCRETE HOSE AND COUPLING

BACKGROUND OF THE INVENTION

The present invention relates to a concrete placement flexible hose of a rubber-like material having a helical wire embedded therein to permit use in distributing of concrete and like products and particularly as a part of a lifting boom apparatus.

In recent development of concrete placement, various piping and distributing means have been developed to facilitate the movement of the concrete from a common receiving point or area at a construction site to the actual distribution area. Thus, various concrete pumps have been developed for delivery of concrete through relatively long distribution lines. To accommodate various on-site locations and configurations, the concrete pumping conduit normally consists of a plurality of rigid or flexible lines or hoses releasably interconnected by suitable couplings. A flexible hose is generally employed in foldable booms for pumping of concrete to the topes of buildings and the like where required. Conventionally, the hoses include grooved metal hose ends which permit connection to an adjacent hose or pipe end by a quick release coupler, for example, as shown in the pending application of Herbert A. Westerlund entitled "CONCRETE CONDUIT COUPLING" which was filed on Apr. 25, 1974 with Ser. No. 463,998, and is assigned to the same assignee as this application. Generally such coupling includes an inner shank of relatively hard metal having a serrated outer surface which fits into the flexible conduit or hose with an outer soft metal ferrule especially deformed onto the hose to firmly affix the hose to the shank. Other prior art methods employ outward expansion of a soft metal shank to form firm physical clamping of the flexible body. Further, the process requires relatively complex attachment means and is relatively slow and expensive. However, the metal must be relatively soft to permit working and is subject to relatively rapid wear when transporting of abrasive materials such as concrete.

In boom-type applications and the like relatively high pressures are employed to move the concrete to relatively high levels. Thus, such units may deliver the material to heights approaching 100 feet and require pumping pressure of 1,000 psi (pounds per square inch). Further, the concrete pump produces a pulsating output which may temporarily increase the pressures significantly above the normal pumping pressures. The flexible hoses must be constructed to withstand such pressures. Further, the collapsible boom requires bending of the hose through 180° and the hose must be constructed so as not to develop a kink or closure at the bending point. In addition, the pulsating may cause a negative pressure condition within the flexible hose tending to collapse the hose. If allowed to collapse, the flow system may be plugged with damage to the system as well as disruption of the construction dependent on the unit. As a result, the flexible boom-mounted hoses and the like are widely specially constructed of a suitable high strength rubber-like material with a continuous embedded hardened wire in the form of a helical coil of relatively close wound turns to support the hose under the usual bending and pressure conditions encountered in the field.

However, the hardened support wire essentially prevents expansion of the hose and has not permitted the use of the hardened shank end coupling such as shown in the previously indentified application. Generally, the soft metal shank constructions has been employed. Even with this construction, the wires interfere with secure attachment of the end coupling to the hose. Although the removal of the wire from the couplingend portion of the hose has been attempted, a weak area develops adjacent the coupling which is more readily subject to failure in the field and thus is not practical.

SUMMARY OF THE INVENTION

The present invention is particularly directed to a highly improved end coupling assembly including an end coupling with a hardened inner shank portion in combination with an outer clamp means in combination with a flexible hose formed with a hardened embedded wire. In accordance with a particularly novel aspect of the present invention, the hose end to which the coupling is secured is specially treated to remove the hardness from the embedded wire within such end while having the balance in the hardened state. The hardened inner shank is then readily inserted and a clamp means applied, which preferably includes a ferrule telescoped over the shank and cold worked with a simultaneous collapsing or depression of spaced portions of the ferrule to establish a plurality of spaced locking indentations, as more fully disclosed in the previously indentified application. Applicant has found that the resulting end coupling is firmly affixed while the hose with the hardened embedded wire otherwise withstands the usual pressure conditions and bending encountered in high pressure concrete pumping.

More particularly, a current is passed through the wire in the coupling end of the hose to anneal and soften the hardened supporting wire. The heating will also tend to separate the wire from the hose body and further facilitate the wire movement when inserting the hose end.

A novel method of heat treating the hose end includes abrading the outer surface of the hose adjacent the innermost edge of the coupling to expose the wire coil. A power supply such as a conventional arc welding machine is connected to the coil at the outer end and at the abraded portion to establish a suitable current for necessary heat treating of the wire within the end coupling in a relatively simple and rapid manner.

This invention thereby provides a very reliable and long life hardened coupling for such wired hoses with the necessary full-flow construction.

BRIEF DESCRIPTION OF THE DRAWINGS

The drawings furnished herewith illustrate a preferred construction of the present invention in which the above advantages and features are clearly disclosed as well as others which will be readily understood from the following description of such illustrated embodiment.

In the drawings.

DESCRIPTION OF ILLUSTRATED EMBODIMENT

Figure 1:
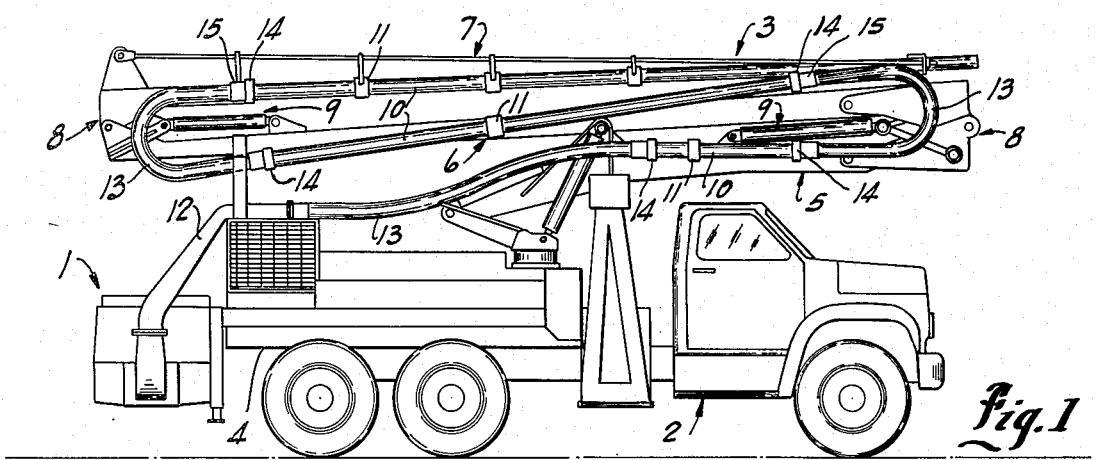
FIG. 1 is a view of a truck-mounted flexible concrete pumping hose constructed in accordance with the teaching of the present invention.
Figure 2:
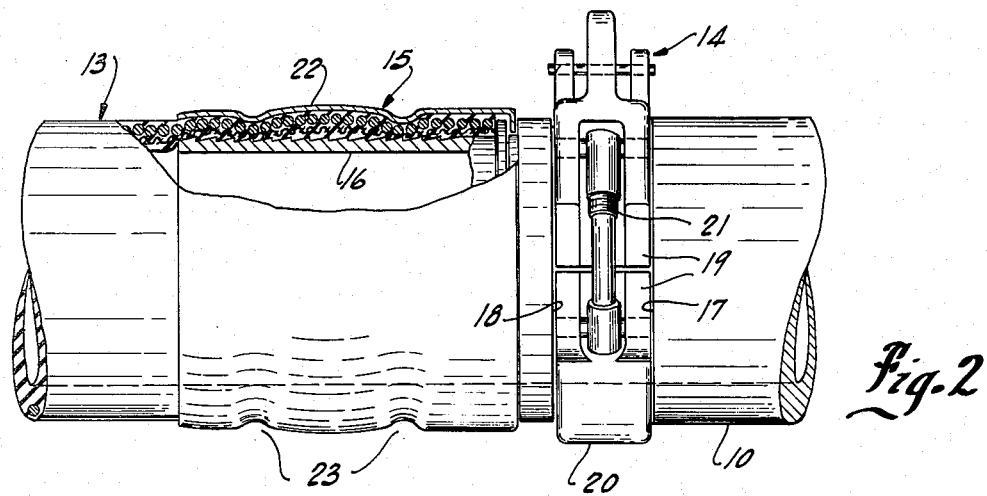
FIG. 2 is an enlarged side elevational view of the hose and end coupling with portions broken away and sectioned to more clearly illustrate the details of construction.

Referring to the drawing and in particular to FIGS. 1 and 2, the present invention is shown applied to truck-mounted concrete pumping apparatus including a concrete pump 1 of any suitable construction mounted on the aft end of a truck 2. An articulated boom 3 is secured to the truck bed 4 and is adapted to be extended upwardly and outwardly for delivery of concrete from the concrete pump to a remote location. The boom 3 is a multiple sectioned mast having three mast sections 5, 6 and 7 interconnected by suitable swivel joints 8. The mast sections 5 – 7 are suitably hydraulically powered in any suitable manner for remote control of the location of the mast, as shown by the hydraulic power cylinder unit 9 at the connecting joints 8. Each of the mast sections 5 – 7 similarly include a rigid replaceable wear pipes or tubes 10 secured to the boom section by a suitable clamp means 11, with the opposite ends exposed for coupling to the pumping system. The first section tube 5 is coupled to a pump outlet tube 12 and the several sections of pipes 10 are coupled to each at the mast joints by flexible high pressure hoses 13 which are specially constructed in accordance with the teaching of the present invention. The hoses 13 are secured to the tubes 10 and 12 by suitable releasable couplers 14. The flexible hoses 13 permit the pivotal movement associated with extension and retraction of the boom sections 5 – 7.

Referring particularly to FIG. 2, the end of the hose 13 is provided with an end coupling 15 which particularly adapts the hose for interconnection to like couplings and to the similarly formed end of pipe 10 through the rapid release coupler 14. Generally each hose coupling 15 includes an inner hardened shank 16 which projects in the hose 13 with an internal diameter essentially corresponding to the internal diameter of the hose 13, and the rigid pipe 10, to provide a continuous or full-flow path construction. The projecting end of the coupling shank 16 includes an outer clamping groove 17 on the outermost end. The end of the rigid pipe 10 is directly formed with a similar groove 18.

The illustrated coupler 14 includes two hinged separable elements 19 such as shown in U.S. Pat. No. 3,705,737. As more fully disclosed therein each element 19 has a generally U-shaped cross-section with edges which mate with the grooves 17 and 18 in the adjacent coupling 15. A flexible seal 20 within the coupler 14 seals the joint between the shank 16 and the end of the pipe 10. A latch unit 21 firmly and tightly collapses the elements 19 to form a firm, rigid interconnection therebetween for the continuous flow of the concrete therebetween. When it is necessary to release the couplings 4 for replacement or removal of one of the hoses 13 or a wear tube 10 the operator merely releases the latch unit 21.

The flow system is required to withstand the pumping forces and the several sections must be firmly attached to each other, and the flexible hoses 13 must withstand the bending during the extension and retraction of the hoses 13. In accordance with the illustrated embodiment of the invention the coupling 15 is generally formed as disclosed in the previously identified application, with the inner shank 16 formed of a hardened steel pipe material. A ductile steel ferrule 22 is telescoped over the hose 13 generally coextending with the inner telescoped shank 16 and the ferrule 22 cold worked to provide a plurality of spaced clamping indentations 23 into the hose 13 and thereby provide firm attachment of the coupling 15 to the flexible hose 13.

The present invention is particularly directed to the construction of the flexible hose 13 and end coupling 15 for releasable connection to other conduit elements. As the pump 1, the truck and boom structures and the coupler 14 can be of any suitable construction, no further description thereof is given other than in connection with the novel features of the present invention.

Figure 3:
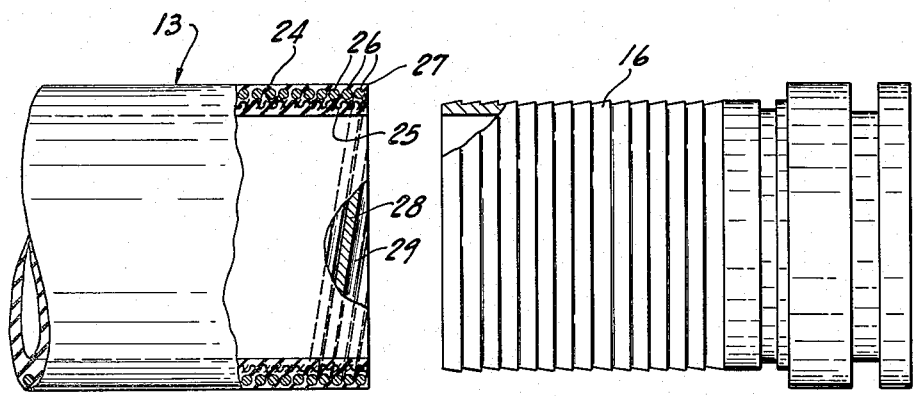
FIG. 3 is a view with the hose separate from an end coupling and with the hose prepared for special processing prior to connection to the coupling.
Figure 4:
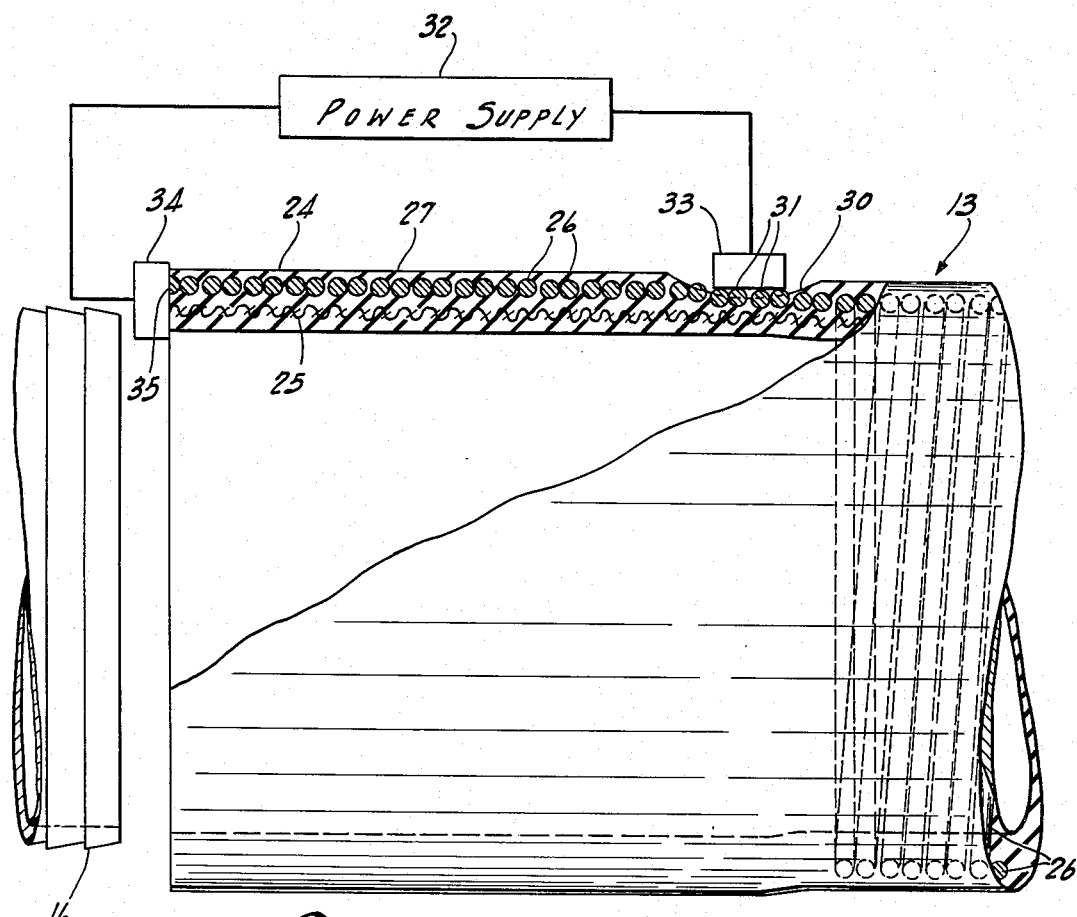
FIG. 4 is an enlarged view illustrating a preferred method of forming the coupling end portion of a hose in accordance with the teaching of the present invention.

More particularly, and referring to FIGS. 3 and 4, the hose 13 is of the hardened wire type and includes a tubular rubber base or body 24 within which the usual strengthening fabric 25, usually of nylon, is embedded adjacent the inner or central portion of the body. In addition, a spiral coil unit 26 of wire is also embedded within the rubber base 24 immediately beneath the outermost surface 27 of the hose 13. In a practical construction, the coil unit 26 is formed as a pair of axially adjacent coils developed by simultaneous winding of a pair of the hardened wires 28 and 29 within the hose body 24. Generally, the hose is formed in a continuous, indefinite length and the coil unit extends from end-to-end including the end portion to which the coupling 15 is secured within any given hose section. The hardened inner coil unit 26 prevents formation of sharp bends within the hose 13 and the collapsing of the hose under negative pressure conditions as previously discussed.

As most clearly shown in the exploded view, FIG. 3, the inner diameter of the hose 13 and particularly the end coupling portion of the hose 13 prior to the assembly and the inner diameter of the hardened shank 16 correspond. During the introduction of the hardened shank 16 into the coupling end of the flexible hose 13, the hose body must expand outwardly to accommodate the material of the hardened shank 16. The hardened wire coil unit 26 within the coupling end portion of known hose structure has prevented the expansion of the hose as such.

In accordance with the teaching of the present invention, the wire coil unit 26 is maintained with continuous wire elements extending from the coupling portion into the connecting portion but the wire portion within the coupling portion of the hose 13 is heat treated to remove the hardness therefrom, and/or to separate such wire portion from the adjacent hose body so as to permit ready movement of the coupling end of hose 13 over the shank 16.

In accordance with a preferred and novel structure the end coupling portion of the hose 13 is especially treated as most clearly shown in FIGS. 3 and 4. The hose body 24, immediately adjacent to the area of the innermost end of the shank 16, has the outer surface thereof abraded or otherwise removed as at 30 to expose the coil unit 26 as at 31. An electrical power supply 32 which may be a conventional arc welding supply unit is provided with a pair of series connecting electrodes 33 and 34 which are connected respectively to the exposed ends of the coil unit 26 on the end of hose 13 as at 35 and to the exposed wire or coil unit 31 at the abraded portion 30. The supply is then turned-on to establish a current flow through the coil unit 26 within the end coupling portion of the hose 13. The wire elements are thus heated rapidly to a desired temperature which will effectively reduce the hardness to a level permitting the ready expansion of the corresponding hose end portion. Alternatively, the heating effect may effect a distinct separation of the hose body 24 from the wire elements of the coil unit 26 and, if required, also permit relative expansion movement of the hose portion. Generally, it has been found desirable to heat treat the wire to remove the hardness to allow actual movement and expanding of the wire as such.

After appropriate heating the electrodes 33 and 34 are, of course, disconnected from the hose 13. The treated end is then forced over the hardened shank 16 and the ductile ferrule. As more fully disclosed in applicant's previously identified copending application, the ferrule is clamped onto the hose 13 by a suitable press or any other suitable means.

In addition to permitting the expansion of the hose 13 onto the shank 16, the heat treating of the hardened wire also facilitates the deforming of the hose within the ferrule in this embodiment of the invention to permit the firm reliable connection provided by the novel coupling end of the above-identified copending application.

Applicant has found that the present method of maintaining the continuity of the wire support within the hose 13 in combination with heat treating thereof to permit expansion within the limited zone provides a highly improved method of attaching a hardened coupling while maintaining long reliable operating life of the hose in the field.

Figure 5:
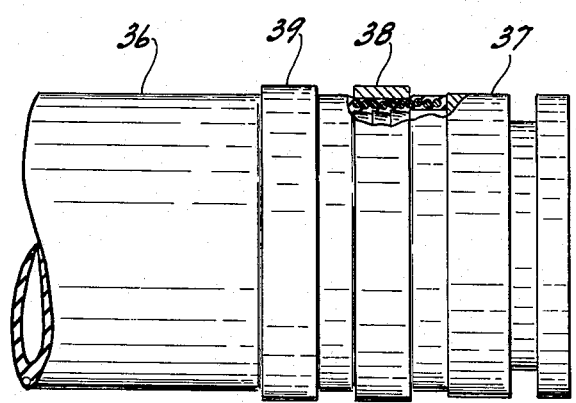
FIG. 5 is a view illustrating an alternative end hose construction.

The illustrated embodiment of the coupling, of course, may take many different forms. For example, the inner wire members employed to strengthen the hose section will generally be in a coil configuration but any other suitable configuration can, of course, be also employed within the concepts and teaching of the present invention. Further, although the ductile ferrule illustrated in the first embodiment of the invention is preferred, any other suitable clamp may be employed. Thus, in FIG. 5, a similar hose 36 is clamped to a hardened shank 37 through a pair of simple clamping bands 38 and 39.

The present invention thus provides a highly improved concrete pumping hose or the like having a flexible body having a hard internal supporting means which is adapted to be placed into a relatively soft or ductile state without total disruption of the hose and which is secured to a relatively hard inner conduit member.

Various modes of carrying out the invention are contemplated as being within the scope of the following claims, particularly pointing out and distinctly claiming the subject matter which is regarded as the invention.

I claim:

1. A concrete placement hose unit comprising a flexible rubber-like hose having a wire support embedded within a rubber-like body, said hose having a coupling end including said wire support and receiving an end coupling shank of a hardened material projecting into the coupling end of said hose and having an inner diameter corresponding to the unstressed inner diameter of said hose, comprising the improvement wherein said wire support includes at least one wire-like element extending continuously through the coupling end and into the adjacent body, said continuous wire-like element being a hardened element within the adjacent body and a relatively soft, ductile element within the coupling end, said shank projecting outwardly of said hose, and a clamp means encircling the end of the hose in alignment with said hardened shank.

2. The concrete placement hose unit of claim 1 wherein said hose unit has the outer surface of the hose body adjacent the inner edge of the coupling end removed to expose at least one wire.

3. The concrete placement hose unit of claim 1 wherein said wire support includes a continuous pair of coils wound as a single layer with adjacent coil turns formed of hardened wire.

4. The concrete placement hose unit of claim 1 wherein said clamp means includes an outer ferrule of ductile metal, and a plurality of indentations being spaced longitudinally of each other and defining the means of interlocking the shank to the hose.

5. The concrete placement hose unit of claim 4 wherein said shank has an outer serrated surface and said ferrule has a smooth inner surface, and said indentations include a single pair of annular indentations longitudinally spaced from each other and from the opposite ends of the ferrule.

* * * * *